United States Patent Office 3,464,927
Patented Sept. 2, 1969

3,464,927
GASEOUS MIXTURE
Jean Chameroy, Guyancourt, France, assignor to Societe Anonyme Groupement Atomique Alsacienne Atlantique (G.A.A.A.), a corporation of France
No Drawing. Filed July 6, 1966, Ser. No. 563,093
Claims priority, application France, July 9, 1965, 24,098
Int. Cl. C09k 3/00; G01t 3/00
U.S. Cl. 252—372                2 Claims

ABSTRACT OF THE DISCLOSURE

A gaseous mixture having a response to γ rays equivalent to that of organic tissues particularly those the energy of which is between about 10 kev. and 10 mev., and also to neutron fluxes of all energies and radiation detectors having said gas for energy absorption.

---

It is known that radiation detectors are utilized to measure the nuclear radiation dose absorbed in the tissues of the human organism. Some of these instruments, such as ionisation chambers and counters, utilise a gas or a mixture of gases for the detection of radiation. In order that the readings given by these instruments may be representative of the dose absorbed by organic tissues, it is necessary that the energy absorbed in the gaseous mixture and that absorbed in the tissues should be in a constant ratio independent of the energy of the radiation within a very wide energy spectrum. In other words, the energy absorption coefficients in the gaseous mixture on the one hand and in the tissues on the other hand must be in a constant ratio whatever the energy of the radiation.

The invention therefore relates to a gaseous mixture equivalent to organic tissues in the sense defined above. The mixture according to the invention comprises from 40 to 60 parts by volume of dimethyl ether ($CH_3OCH_3$), from 4 to 14 parts by volume of methylamine ($CH_3NH_2$), and from 36 to 46 parts by volume of neon.

A preferred composition of the gaseous mixture according to the invention is as follows:

|   | Percent by volume |
|---|---|
| Dimethyl ether | 50 |
| Methylamine | 8.6 |
| Neon | 41.4 |

For gamma radiation of from 10 kev. to 10 mev. the ratio of the coefficients of absorption in the preferred gaseous mixture of the invention and in the tissues of the organism is equal to 0.99±0.01. It should be noted that this gaseous mixture contains 10.1% of hydrogen and 3.5% of nitrogen; in other words, taking into account the proportions existing in the tissues of the organism the absorption is therefore also in the ratio of 0.99 for neutrons. The mixture therefore has the same response as human tissues both to neutrons and to gamma rays.

The gaseous mixture of the invention has a certain number of advantages in comparison with the gases or mixtures of gases utilised in the prior art for the same type of application. Firstly, the gases of the mixture according to the invention do not individually have a high diffusing power; hence their retention in a closed container is facilitated. Gases previously used, such as methane, on the contrary, diffused too easily through the walls of the container, which was a serious disadvantage.

Secondly, the mixture of the invention has a density higher than that of the gases or mixtures of gases previously known, thus making it possible to determine radiation absorption with greater sensitivity.

Thirdly, the mixture according to the invention is heavier than air, whereas the gaseous mixtures previously proposed or used are lighter. Thus, the density of the preferred mixture (50% of dimethyl ether, 8.6% of methylamine, 41.4% of neon) is 1.2 at 15° C. This property is particularly advantageous when monitoring of radiation must be effected from a built-in-source.

What is claimed is:
1. A gaseous mixture comprising from 40 to 60 parts by volume of dimethyl ether, 4 to 14 parts by volume of methylamine and 36 to 46 parts by volume of neon.
2. A gaseous mixture according to claim 1 comprising about 50% by volume of dimethyl ether, about 8.6% by volume of methylamine, and about 41.4% by volume of neon.

References Cited

UNITED STATES PATENTS 2,519,864   8/1950   Weisz _____ 252—372 X

LEON ZITVER, Primary Examiner
H. T. MARS, Assistant Examiner

U.S. Cl. X.R.
313—224